United States Patent [19]

Kleinlein et al.

[11] Patent Number: 4,814,912

[45] Date of Patent: Mar. 21, 1989

[54] MAGNETIC-TAPE APPARATUS

[76] Inventors: Herbert Kleinlein, Sudetenstrasse 8, D.8507 Oberasbach; Ernst Bratenstein, Taubenweg 26; Friedrich Gärtner, Zoppoterstrasse 6, both of, D.8510 Fürth, all of Fed. Rep. of Germany

[21] Appl. No.: 73,837

[22] Filed: Jul. 14, 1987

Related U.S. Application Data

[63] Continuation-in-part of Ser. No. 71,221, Jul. 8, 1987, abandoned.

[30] Foreign Application Priority Data

Jul. 8, 1986 [DE] Fed. Rep. of Germany ....... 3622859

[51] Int. Cl.$^4$ .................... G11B 15/24; B65H 16/10
[52] U.S. Cl. ............................ 360/96.3; 242/200; 242/201; 242/204
[58] Field of Search ............... 360/96.3, 137; 242/200, 242/201, 204

[56] References Cited

U.S. PATENT DOCUMENTS

| 4,564,873 | 1/1986 | Hashimoto et al. | 360/96.3 |
| 4,591,935 | 5/1986 | Kouda | 360/96.3 |
| 4,623,946 | 11/1986 | Ida | 360/96.3 |
| 4,635,146 | 1/1987 | Koda et al. | 360/96.3 |
| 4,708,302 | 11/1987 | Yamaguchi et al. | 360/96.3 |

Primary Examiner—Robert S. Tupper
Attorney, Agent, or Firm—David R. Treacy

[57] ABSTRACT

A magnetic-tape apparatus comprises a device for the power-assisted actuation of a tape-sensing lever during switching from the playing mode of the apparatus to the reverse-search mode of the apparatus. The direction of rotation of the reel discs is changed by means of a pivotal drive mechanism which is driven by a drive motor. The power for the controlled actuation of the tape-sensing lever is obtained in that a coupling gear associated with the pivotal drive mechanism engages with a stationary gear pin. This ensures that the coupling gear performs a controlled movement, which is used for controlling the tape-sensing lever.

12 Claims, 2 Drawing Sheets

MAGNETIC-TAPE APPARATUS

This application is a continuation-in-part of application Ser. No. 071,221, filed July 8, 1987, now abandoned.

BACKGROUND OF THE INVENTION

The invention relates to a device for the power-assisted actuation of a tape-sensing lever in a magnetic-tape apparatus during switching from the playing mode of the apparatus to the reverse search mode of the apparatus, and more particularly to such an apparatus which which apparatus comprises only one drive motor for driving the two reel discs, which are driven through a centrally arranged pivotal drive mechanism. The direction of tape transport is reversed by reversing the direction of rotation of the drive motor, thus pivoting a lever carrying a coupling gear and a driving gear.

Magnetic-tape apparatuses for recording and reproduction are known in which some apparatus functions are controlled by changing the direction of rotation of the drive motor. For example, DE-PS No. 828,923 and DE-GM No. 1,730,790 disclose a device for controlling an audio-tape apparatus in which rewinding of the sound-carrier tape is controlled by changing the direction of rotation of the drive motor. In these known constructions an intermediate gear is pivoted about the shaft of the drive motor to mesh with either the take-up reel or with the supply reel depending on the direction of rotation of the motor. For this purpose the intermediate gear is preferably mounted on a pivotal lever which is supported on and pivots about the motor shaft. The intermediate gear wheel is, in mesh with a pinion which is rigidly mounted on the motor shaft. To provide pivoting torque, the pivotal level and the pinion on the motor shaft are in frictional engagement with one another. In a known modified device the intermediate gear, which is arranged on a pivotal lever in a similar way, follows a stationary roller path on the apparatus during the pivotal movement. This enables an apparatus function requiring much power to be carried out. An apparatus function requiring much power is, for example, disabling of the tape-tension control which was necessary during the playing mode of the apparatus, when switching from this playing mode to the reverse search mode of the apparatus. By means of a pivotal drive mechanism the direction of rotation of the reels is reversed substantially without any additional expenditure of power by reversing the direction of rotation of the drive motor. However, if at the same time as this rotation is reversed a spring-loaded tape-sensing lever is to be actuated, this briefly demands additional power. In the known device power conversion is effected by means of an intricate control profile formed on the pivotal lever. This has the disadvantage that the drive mechanism may become blocked inadvertently as a result of the free interengagement of the parts of the mechanism.

SUMMARY OF THE INVENTION

It is the object of the invention to mitigate this drawbacks in apparatuses of the type defined in the opening paragraph, and to provide a device which in a simple way enables power-assisted actuation of a tape-sensing lever in a magnetic-tape apparatus to be effected during switching from the normal direction mode of the apparatus to the reverse direction mode of the apparatus. According to the invention, in addition to the coupling gear the pivotal lever carries a pinion which is preferably coaxial and rotates with the coupling gear. A stationary tooth or gear pin is mounted to engage the pinion while the coupling gear is moving between the two reel discs. The gear pin thus provides an increased torque for pivoting the pivotal lever during the time that the coupling gear is not meshed with one of the reel discs.

Embodiments of the invention will be described in more detail, by way of example, with reference to the accompanying drawings.

DESCRIPTION OF THE PREFERRED EMBODIMENTS

Figure 1:
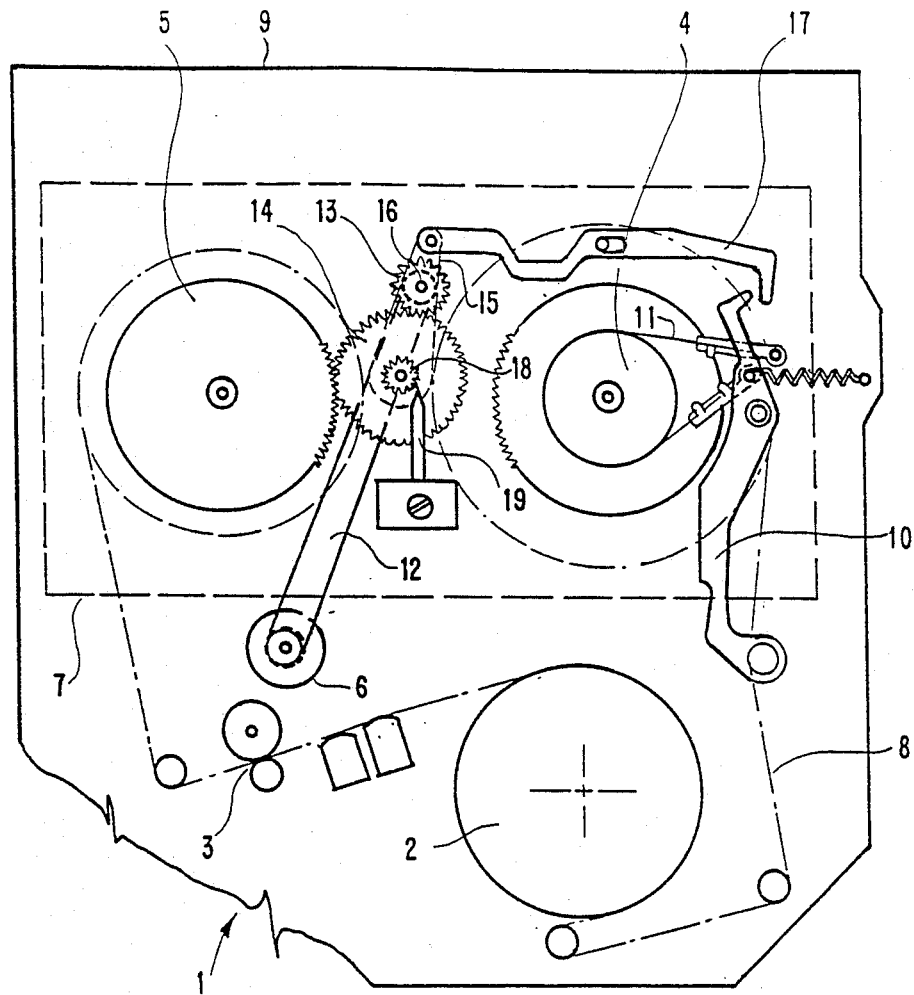
FIG. 1 is a simplified plan view of the relevant parts of the drive mechanism of a magnetic-tape, apparatus according to the invention, in the playing position.

FIG. 1 is a simplified view of a magnetic-tape video apparatus 1, which mainly comprises a head drum 2, a capstan drive 3, two selectively drivable reel-drive means, hereinafter simply referred to as reel discs 4 and 5, and a reel-drive motor 6. For simplicity all the other control and drive parts of the apparatus are not shown. The tape cassette 7 with the rolls of tape and the part of the magnetic tape 8 which is extracted from the cassette are shown in dash-dot lines. All the apparatus parts for the deck of the magnetic-tape video apparatus are arranged on a chassis 9. During the playing mode of the apparatus the tape tension of the magnetic tape is controlled by means of a tape-sensing lever 10 which pulls on brake band 11 wrapped around a flange on the reel disc 4. A brake spring 10a biases the lever 10 in the direction of increasing brake force.

The reel disc 5 is driven by the drive motor 6, which is coupled to a driving gear 13 via a belt 12. The driving gear 13 is constantly in mesh with a coupling gear 14, which is selectively engageable with the reel discs 4 and 5. For driving by the coupling gear 14, the reel discs 4 and 5 are provided with peripheral teeth. The driving gear and coupling gear are arranged on a pivotal lever 15 to constitute a pivotal drive mechanism controlled by the drive motor. The pivotal drive mechanism is mounted between the two reel discs on the apparatus chassis. The pivotal drive mechanism is changed over by reversing the direction of the rotation of the drive motor. The coupling gear is rotatably mounted on the pivotal lever through a friction coupling. The pivot (the spindle 16) of the pivotal lever is located on the axis of rotation of the driving gear 13. Viewed from its pivot the pivotal lever comprises two arm portions, one arm portion carrying the coupling gear 14 and the other arm portion being coupled to a control slide 17. The control slide is slidably supported on the chassis, and has a hooked end which can pull the spring-loaded tape-sensing lever 10 against the force of the spring 10a.

When the reel drive is changed over from the normal direction mode of the apparatus of the reverse direction mode of the apparatus, the pivotal drive mechanism is pivoted by reversing the direction of rotation of the drive motor, so that the coupling gear 14 meshes with the reel disc 4 and winds the magnetic tape back into the cassette. Simultaneously with the pivotal movement of the pivotal drive mechanism the control slide 17 is moved. This movement of the control slide causes the hooked end to engage an arm portion of the tape-sensing lever, pulling it counterclockwise through a small angle into the position in which the brake band of the reel disc is slackened.

The power for further tensioning the brake spring 10a is obtained from the motor through the pivotal lever 15 by operation of the invention. A pinion 18 is fixed to the coupling gear 14 so that they rotate coaxially. A stationary tooth, or gear pin, 19 is mounted to the drive mechanism frame, axially in line with the pinion 18, but between the positions of the pinion 18 in the playing and rewind modes. The pin 19 has a small clearance from the pinion 18 in each of these modes. As a result, when the motor is reversed from the playing direction to the rewind direction, the lever 15 begins to pivot toward the rewind disc 4, and the slide 17 is pulled toward the brake lever 10. Clearances are designed such that the pinion 18 engages the pin 19 before the slide 17 engages the brake lever 10 and commences stretching the spring 10a. The extra torque required to pivot the lever 15, against the spring force, is obtained through the engagement of the pinion 18 with the pin 19.

Thus, during the pivotal movement the combined coupling gear 14 an pinion 18 are always in mesh with either one of te reel discs or with the pin 19.

Figure 2:
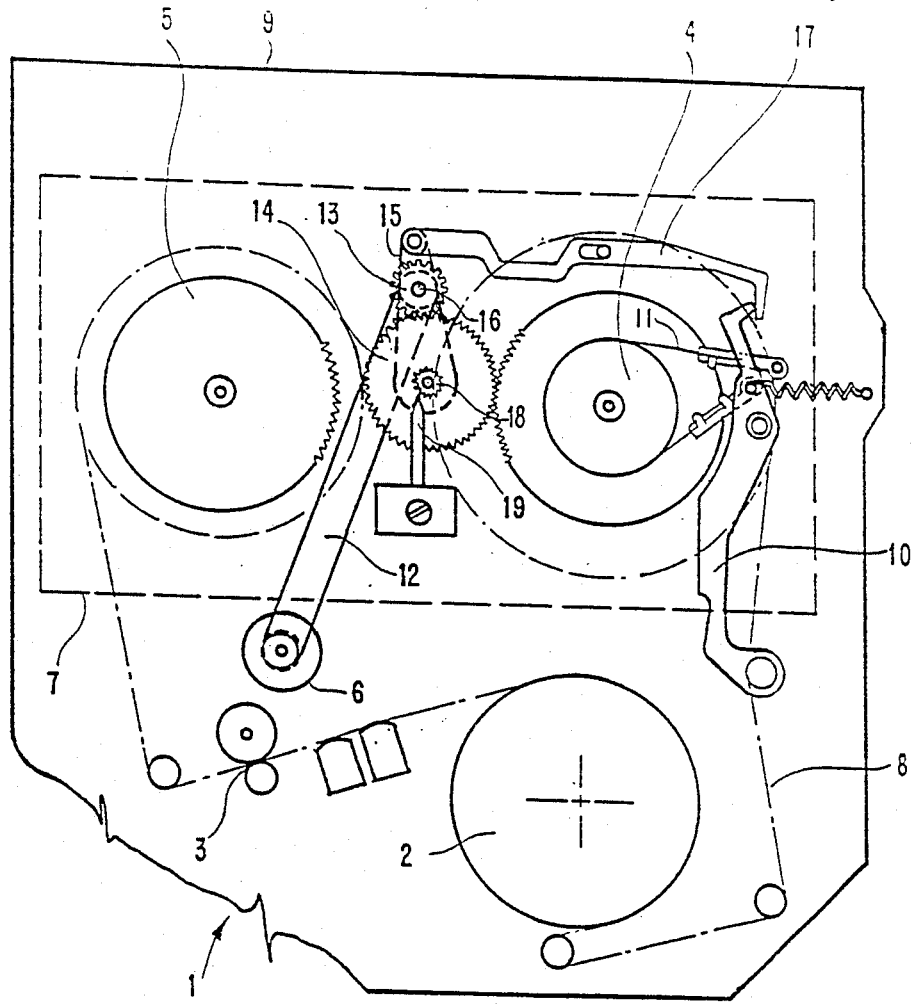
FIG. 2 is a similar view of the embodiment in the rewind position of FIG. 1.

FIG. 2 shows the position of the pivotal drive mechanism after a pivotal movement during which the tape-sensing lever 10 has been pivoted slightly counterclockwise and set to a position in which the brake band of the reel disc 4 is released. After completion of the pivotal movement of the pivotal drive mechanism the pin 19 no longer engages with the pinion 18. The pivotal drive mechanism performs the same operations during every change of the direction of rotation of the drive motor.

Preferably the pin 19 is at the end of a limb, and the pin and the limb are a unitary element made from a somewhat elastic plastic. The limb should be sufficiently rigid that it does not deflect substantially, but sufficiently elastic that the pin does not jam against a tooth of the pinion 18. Of course, it will be clear that a greater lever 15 movement can be provided if, rather than one pin or tooth 19, two or more teeth are formed at the end of the limb.

A further embodiment of the invention involves manufacturing the pinion 18 and coupling gear 14 as a stepped gear from a slightly elastic plastic.

What is claimed is:

1. In a magnetic-tape apparatus including two reel discs; a belt; only one drive motor; a centrally arranged pivotal drive mechanism for selectively coupling one or the other of said reel discs to said motor through said belt, said drive mechanism comprising a pivotal lever, and a coupling gear and a driving gear carried on said lever, said driving gear being driven by said belt, and said coupling gear being driven by said driving gear arranged such that the direction of tape transport is reversed by reversing the direction of rotation of said motor thereby causing said pivotal level to pivot to move the coupling gear from operative connection to one of said reel discs into operative connection with the other of said reel discs; means for switching from a playing mode to a reverse mode; a brake band arranged for influencing at least one of said reel discs; and a tape-sensing lever, a device for power-assisted actuation of the tape-sensing lever during switching from the playing mode to the reverse mode, characterized in that said decive comprises a control slide, a pinion arranged integrally with said coupling gear, and a single stationary gear pin, said tape-sensing lever is coupled to said mechanism via said control slide, and is arranged to influence only one reel via said brake band, and during pivotal movement of said pivotal lever said coupling gear briefly engages said single stationary gear pin via said integral pinion, and during this engagement brings the tape sensing lever into a position in which the brake is inoperative.

2. A device as claimed in claim 1, characterized in that during the pivotal movement of the pivotal drive mechanism the coupling gear is constantly in mesh with one of the two reel discs or with the stationary gear pin.

3. A device as claimed in claim 2, characterized in that the stationary gear pin has an associated limb with which it is manufactured in one piece from an elastic plastic.

4. A device as claimed in claim 3, characterized in that the coupling gear with its integral pinion is manufactured as a stepped gear from an elastic plastics.

5. A device as claimed in claim 4, characterized in that the coupling gear is rotatably connected to the pivotal lever of the pivotal drive mechanism via a friction coupling.

6. A device as claimed in claim 5 characterized in that the coupling gear is constantly in mesh with the driving gear and in that the driving gear is journalled on the same spindle as the pivotal lever.

7. A device as claimed in claim 6, characterized in that said belt is an elastic belt for driving said driving gear by said motor.

8. A device as claimed in claim 1, characterized in that the stationary gear pin has an associated limb with which it is manufactured in one piece from a slightly elastic plastic.

9. A device as claimed in claim 1, characterized in that the coupling gear with its integral pinion is manufactured as a stepped gear from elastic plastic.

10. A device as claimed in claim 1, characterized in that the coupling gear is rotatably connected to the pivotal lever of the pivotal drive mechanism via a friction coupling.

11. A device as claimed in claim 1, characterized in that the coupling gear is constantly in mesh with the driving gear and in that the driving gear is journalled on the same spindle as the pivotal lever.

12. A device as claimed in claim 1, characterized in that said belt is an elastic belt for driving said driving gear by said motor.

* * * * *